United States Patent Office.

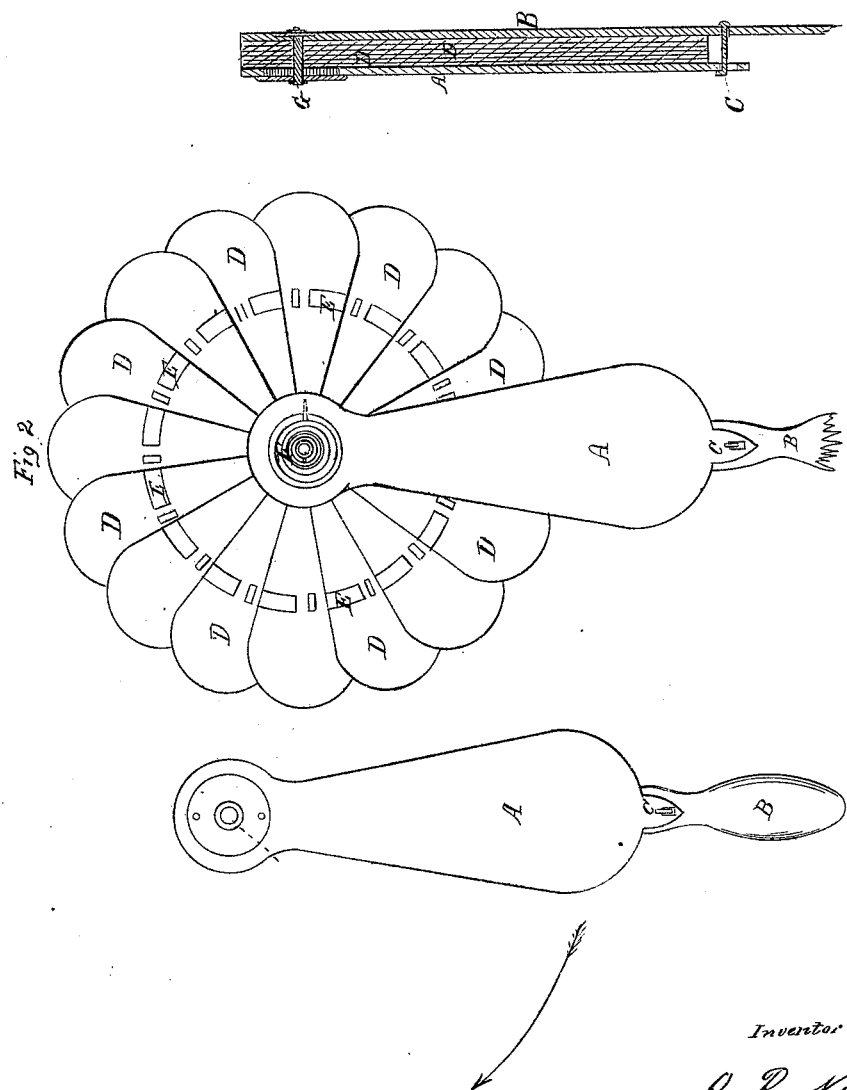

O. R. NITSCH, OF NEW YORK, N. Y.

Letters Patent No. 91,156, dated June 8, 1869.

IMPROVEMENT IN FANS.

The Schedule referred to in these Letters Patent and making part of the same.

*To all whom it may concern:*

Be it known that I, O. R. NITSCH, of New York city, county and State of New York, have invented a new and improved Fan; and I do hereby declare that the following is a full and exact description thereof, reference being had to the accompanying drawings, and to the letters of reference marked thereon.

Figure 1 is a view of the fan when shut.
Figure 2 is a side view.
Figure 3 is a sectional view of the fan, showing the insertion of the spring F in the upper leaf.

The nature of my invention consists in attaching a spring to the leaves of a fan, in such manner as to cause it to open readily, when desired.

Fig. 1 represents the fan when shut. The upper lid or leaf A is held by a catch, C, to the under lid or leaf B. The catch C can be made of any kind of material or formation.

The leaves D are connected by one or more bands, E, to the upper and under lid or leaf. Thus, when the upper leaf A is propelled by the spring F to the right, and around the pivot G, (as shown by the arrow, in red,) the leaves D are successively arranged in a circular formation, as shown by fig. 2, the upper leaf A is arrested again in its swing by the catch C, and the band or bands E.

One end of spring F is fastened to the pivot G, the other end to the upper leaf A, in which a circular hole is made, large enough to receive the spring, and allow its operation.

What I claim as my invention, and desire to secure by Letters Patent, is—

As a new article of manufacture, a fan, whose leaves are attached together and opened by a spiral spring, attached to the outer leaf, substantially as described.

O. R. NITSCH.

Witnesses:
GEORG BORDES,
ADOLPH WEILE.